(12) United States Patent
Chen (10) Patent No.: US 6,744,557 B1
(45) Date of Patent: Jun. 1, 2004

(54) COMPOUND LENS ARRANGEMENT FOR USE IN LENS ARRAYS

(75) Inventor: Cheng-Huan Chen, Eindhoven (NL)

(73) Assignee: Qinetiq Limited, Farnborough (GB)

( * ) Notice: Subject to any disclaimer, the term of this patent is extended or adjusted under 35 U.S.C. 154(b) by 25 days.

(21) Appl. No.: 10/031,485

(22) PCT Filed: Jul. 17, 2000

(86) PCT No.: PCT/GB00/02736

§ 371 (c)(1),
(2), (4) Date: Mar. 21, 2002

(87) PCT Pub. No.: WO01/06299

PCT Pub. Date: Jan. 25, 2001

(30) Foreign Application Priority Data

Jul. 19, 1999 (GB) ............................................. 9916715

(51) Int. Cl.[7] .................... G02B 27/22; G02B 27/10; G03B 21/00
(52) U.S. Cl. ................... 359/362; 359/466; 359/619; 359/455; 353/7
(58) Field of Search ................ 359/362, 455–458, 359/462–464, 466, 471–472, 619; 353/7

(56) References Cited

U.S. PATENT DOCUMENTS

| | | | |
|---|---|---|---|
| 4,109,263 A | 8/1978 | Johnson | |
| 4,756,601 A | 7/1988 | Schroeder | |
| 4,852,980 A | 8/1989 | Shinichi | |
| 5,568,322 A | 10/1996 | Azami et al. | |
| 5,614,941 A | 3/1997 | Hines | |
| 5,825,540 A | 10/1998 | Gold et al. | |
| 5,835,288 A | 11/1998 | Yamada et al. | |
| 5,993,003 A | * 11/1999 | McLaughlin | 353/7 |
| 6,224,214 B1 | * 5/2001 | Martin et al. | 353/7 |

FOREIGN PATENT DOCUMENTS

| | | |
|---|---|---|
| EP | 0 585 651 A | 3/1994 |
| GB | 1 215 842 | 12/1970 |
| GB | 1 502 546 | 3/1978 |
| GB | 2 296 783 A | 7/1996 |
| WO | 98 43441 | 10/1998 |

OTHER PUBLICATIONS

Chen, C H et al; "New Projection Lens for Three–Dimensional Displays"; Electronics Letters; vol. 35, No. 24; Nov. 25, 1999; pp. 2137–2138; XP000961582.

Patents Abstracts of Japan; vol. 1997, No. 01; Jan. 31, 1997 & JP 08 240788 A; Sep. 17, 1996; Abstract; figures.

Bader G et al; "8.1: An Autostereoscopic Real–Time 3D Display System" Eurodisplay. SID's International Display Research Conference; vol. Conf. 16; Oct. 1, 1996; pp. 101–104; XP000729551; ISSN: 1083–1312.

Borner R; "Autostereoscopic 3D–Imaging by Front and Rear Projection and on Flat Panel Displays" Display., vol. 14, No. 1; 1993; pp. 39–46; XP000960395.

Little G R et al; "Multiperspective Autostereoscopic Display"; Proceedings of the SPIE; vol. 2219, Apr. 7–8, 1994; pp. 388–394; XP000961626.

Born Max and Wolf Emil; "Principles of Optics"; 1974; Pergamon Press: XP002152171.

* cited by examiner

Primary Examiner—Scott J. Sugarman
Assistant Examiner—Darryl J. Collins
(74) Attorney, Agent, or Firm—Nixon & Vanderhye P.C (57) ABSTRACT

A compound lens arrangement for use in an array of such lens arrangements comprising at least two lens elements including a front lens element having a front lens surface which is the largest diameter lens surface in the compound lens arrangement, wherein the exit pupil of the compound lens is bounded by and lies in the plane of the edge of said front lens surface. This enables the compound lens arrangements in an array to abut. The invention particularly relates to compound lens arrangements for use in projectors which projectors are used in an array in an autostereo projection system and allows adjacent projectors to abut.

14 Claims, 6 Drawing Sheets

COMPOUND LENS ARRANGEMENT FOR USE IN LENS ARRAYS

This application is the US national phase of international application PCT/GB00/02736 filed Jul. 17, 2000, which designated the US.

The present invention relates to a compound lens for use in arrays of lenses and in particular to a compound lens for use in arrays of lenses or for use in projectors arranged in an array in multi-perspective autostereo projection systems.

In known multi-perspective autostereo projection systems the images from a plurality of projectors which show different perspective views of an object are projected onto a direction selective projection screen, such as a field lens. Such screens have the characteristic of re-forming the array of images of the projector lens exit pupils in a "viewer space" so that each viewer of the screen sees a stereo image pair and accordingly sees a three dimensional image. Thus, if a viewer horizontally crosses between adjacent images, the three dimensional image changes discontinuously or "flips". A problem with this type of display is that the images seen by the viewer are separated by dark regions associated with gaps between the projection lenses.

In a paper entitled "Autostereoscopic 3D-imaging by front and rear projection and on flat panel displays" by R Borner which was published in "Displays", Volume 14, Number 1, 1993 by Butterworth-Heinemann Ltd, this problem is tackled by overlapping the exit pupils of the projector lenses by using at least two vertically spaced layers of projectors lenses horizontally off-set with respect to each other. In this way the axis of an exit pupil of a projector lens in a first layer will lie in a horizontal plane located between the axes of the exit pupils of two adjacent projector lenses in a second layer. The images of the projector lens exit pupils from different layers can be overlapped in the "viewer space" using lenticular screens in order to eradicate dark regions between the images in the "viewer space". A similar approach is used in a paper entitled "An autostereoscopic real-time 3D display system" by G. Bader, E. Lueder and J. Fuhmann published in Euro Display '96. The resulting display apparatus using such multi-layer arrangements can be overly complex and the use of lenticular arrays to spread out the exit pupil image can affect the projected picture quality.

In a paper entitled "Multiperspective autostereoscopic display" by Gordon R. Little, Steven C. Gustafson and Vasiliki E. Nikolaou published in SPIE Volume 2219 Cockpit Displays (1994), the problem of gaps between adjacent images in the "viewer space" is solved by using a pupil forming screen which comprises a Fresnel lens and a lenticular array to spread out each image in the "viewer space" to remove any gaps between adjacent images. This again has the disadvantage of affecting the projected picture quality by reducing the resolution of the display.

In WO98/43441 an autostereo projection system is provided which uses multiple projectors to form an essentially seamless and extended field of view. Each projector is registered to a CRT display and shutter elements in each projector create multiple pupils for each CRT display. Each CRT display is driven with different images for each shutter pupil. Seamlessness is promoted by the use of a tunable optical diffuser as part of a common lenticular viewing lens. In WO98/43441 the adjacent compound lenses of the projectors abut, however, the exit pupils of the compound lenses do not abut, which results in dark spaces between adjacent images in the viewer space which are reduced by the use of the diffuser.

The present invention aims to overcome at least some of the problems discussed above by providing a compound lens for use in arrays of lenses which substantially eliminates the problem of dark spaces between images in the "viewer space" without requiring over-complex display arrangements and without reducing the resolution of the image seen by the viewer.

According to a first aspect of the present invention there is provided a compound lens for use in an array of such lenses comprising at least two lens elements including a front lens element having a front lens surface which is the largest diameter lens surface in the compound lens, wherein the exit pupil of the compound lens is bounded by and lies in the plane of the edge of said front lens surface. In such a compound lens the exit pupil lies at the front of the compound lens at the largest diameter lens surface of the compound lens which means that in an array of such compound lenses, adjacent abutting lenses will have adjacent abutting exit pupils. Thus, there will be no gaps between the exit pupils of adjacent compound lenses and so the present invention can be used to eliminate the problem of dark spaces between images in the "viewer space" in autostereo projection systems. The compound lens according to the present invention is of use in any application requiring the use of arrays of lenses with abutting exit pupils.

The aperture stop may be located within the front lens element of the compound lens. Preferably, the aperture stop of the lens lies in front of the lens element(s) of the compound lens other than the front lens element as this improves the symmetry of the lens arrangement about the aperture stop and helps to reduce coma, distortion and transverse colour in the compound lens. The aperture stop of the compound lens may lie in a plane which intersects the optical axis of the compound lens at the rear lens surface of the front lens element.

The front lens element may itself be a compound lens or alternatively could comprise a single lens. It is preferred that the rear lens surface of the front lens element is concave and further that the front lens surface of the front lens element is convex.

In a preferred arrangement the front lens element is the largest diameter lens element in the compound lens.

The first aspect of the present invention relates to a compound lens with its exit pupil located at its last (or front) surface with the edge of the exit pupil being the intersecting ring of the plane where the exit pupil is located and said last surface. The diameter of the exit pupil defines the largest diameter of the compound lens and the radius of the exit pupil is larger than or equal to all the ray heights traced through the compound lens without vignetting. Thus, several such compound lenses can be arranged in an array so that their exit pupils abut so that there will be no dark zone when this compound lens array is used as the projection lens array in a multi-projector autostereoscopic display.

According to a second aspect of the present invention there is provided a projector for use in an array of such projectors comprising a compound lens according to the first aspect of the present invention. As discussed above such a projector can be used in an abutting array of such projectors in an autostereo projection system in order to eliminate gaps between images in the "viewing space" of the system.

According to a third aspect of the present invention there is provided an autostereo projection system comprising an array of projectors according to the second aspect of the present invention.

According to a fourth aspect of the present invention there is provided a method of designing a compound lens for use in an array of such lenses comprising the steps of;

defining the material of a front lens element of the compound lens, the diameter of a front lens surface of the front lens element, the radius of curvature of the front lens surface and a rear lens surface of the front lens element and defining the location of an exit pupil of the compound lens arrangement to be bounded by and in the plane of the edge of said front lens surface, based on the above defined parameters, tracing the location and magnitude of an aperture stop of the compound lens by tracing the marginal rays through the front lens element using ray tracing means, repeating the above steps until the marginal ray heights through the front lens element are highest at the exit pupil, and then fixing the above defined parameters, defining the diameters of the remaining lens surfaces of the compound lens to be less than that of the front lens surface of the front lens element and defining the functionality of the compound lens, using ray tracing means to design the remainder of the compound lens, in such a way that the remaining lens surfaces do not alter the relationship between the exit pupil and the marginal ray height through the front lens element defined above.

Preferably, the parameters defined in the first step of the method are only fixed when the diameter of the aperture stop is less than the diameter of the exit pupil.

This method can be used to design a compound lens according to the first aspect of the present invention and which will have the advantages associated with the first aspect of the present invention.

The term marginal ray is used generally to describe those rays which pass through the edge of an aperture stop or an entrance or exit pupil of a lens system. The marginal ray is that ray which is the highest (ie. moves furthest away from the optical axis) amongst the rays traced through a lens system from an object point. In a compound lens according to the present invention the marginal rays will pass through the edge of the exit pupil, because the exit pupil is real.

Preferably, the step of defining the diameter of the front lens surface of the front lens element comprises the step of defining the diameter of the front lens element.

Preferably, the step of defining the functionality of the compound lens comprises the step of defining the compound lens as a finite conjugate lens with specified object and image distances as such a compound lens would be suitable for use in a projector of an autostereo projection system. Alternatively, the compound lens could be defined as a finite-infinite conjugate lens element For the purposes of the present invention the aperture stop shall be defined as the image of the exit pupil.

The present invention will now be described by way of example only with reference to the accompanying figures in which.

Figure 1A:
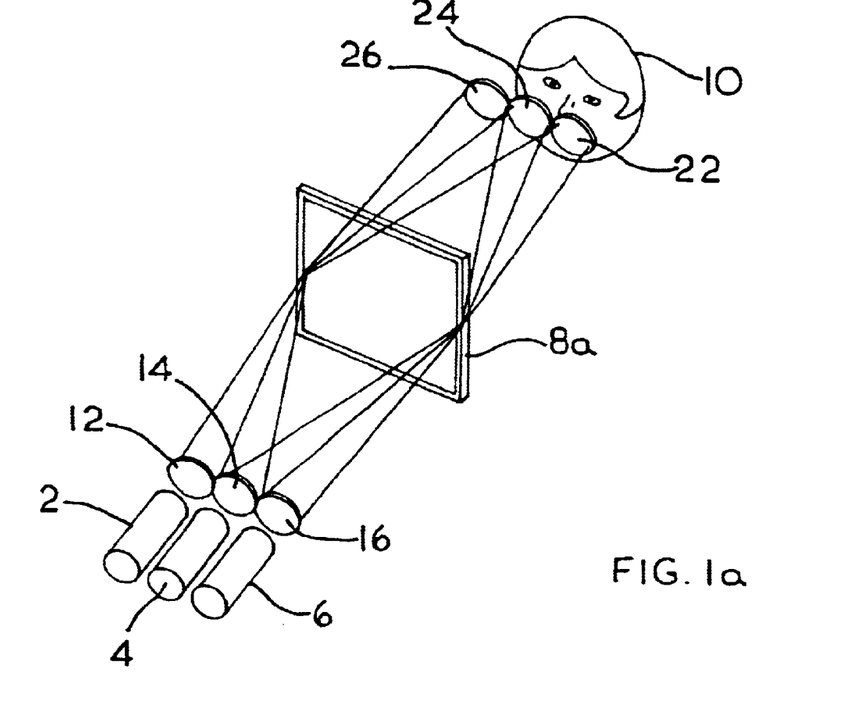
FIG. 1a shows schematically a multi-perspective autostereo display system using a direction selective projection screen and an array of projectors each comprising a compound lens according to the present invention.
Figure 1B:
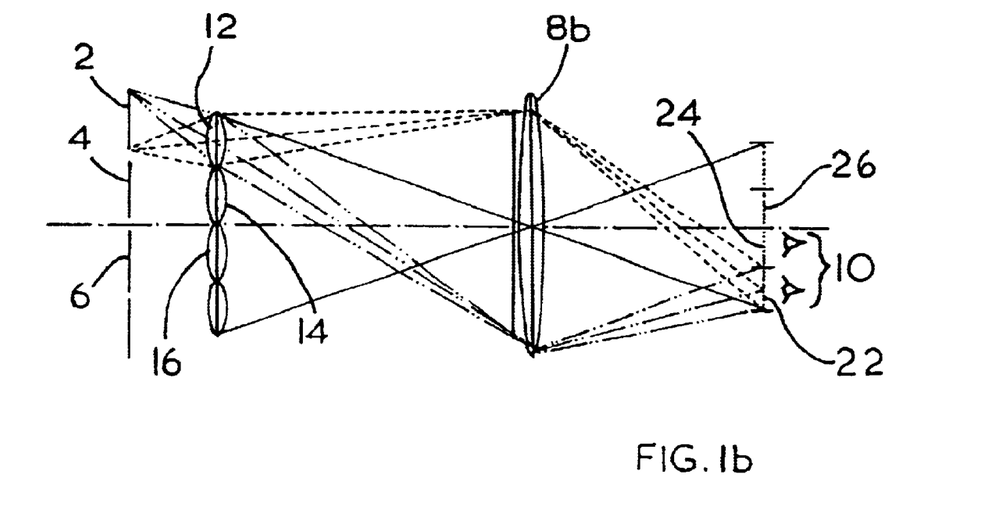
FIG. 1b shows schematically a multi-perspective autostereo display system using a field lens and an array projectors each comprising a compound lens according to the present invention.

FIGS. 1a and 1b show multi-perspective autostereo display systems in which three projectors (2,4,6) each project an image taken from a different perspective of an object or scene. Each projector (2,4,6) comprises a respective compound lens arrangement (12, 14, 16) in accordance with the present invention which is designed as described below so that the exit pupil of each lens coincides with the front surface of the lens and so that the front element of the lens has the largest diameter. This means that the exit pupils of the compound lenses (12,14,16) can be located adjacent each other so that they touch, thus eliminating any gaps between the exit pupils of adjacent projector lenses (12,14, 16).

A direction selective projection screen (8a) in FIG. 1a or a field lens (8b) in FIG. 1b re-forms the images of the projector lens exit pupils in the viewer space to form images (22,24,26) and as can be seen from FIGS. 1a and 1b adjacent ones of these images also touch each other to eliminate gaps between adjacent images in the "viewer space". A viewer (10) located in a first viewing position sees image (22) from projector (2) in one eye and image (24) from projector (4) showing the same object or scene from a different perspective in the other eye so that the viewer sees a three dimensional image from a first perspective. If the viewer were to move his or her head to the left in FIG. 1a or upwards in FIG. 1b to a second viewing position so that he or she sees image (24) from projector (4) in one eye and image (26) from projector (6) in the other eye so that he or she would see a three dimensional image of the object or scene from a second perspective. In moving from the first to the second viewing position the three dimensional image viewed would flip between the first and the second perspective, but there would be no dark spaces between the different images viewed by the viewer (10) because there is no gap between adjacent images (22) and (24) or adjacent images (24) and (26).

Accordingly, it can be seen that the compound lens arrangement according to the present invention enables the projectors (2,4,6) to abut so that there is no drop off in illumination between viewing zones (22,24,26). This provides a simplified, single layer projector arrangement without prejudicing the resolution of the images (22,24,26) in the "viewing space".

In order to be able to locate compound lenses in an array so that their edges touch it is not the aperture stop of the lenses which must abut, but the exit pupil of the lenses. The exit pupil is generally defined as an image of the aperture stop as seen from the image side (or in the image space) of the lens. In conventional lens designs the exit pupil is a virtual image formed deep inside the lens, close enough to the aperture stop that there is little difference between the two. However, if the lens elements in the compound lens between the aperture stop and the exit pupil are appropriately chosen it is possible for the edges of the exit pupil to coincide with the edges of the front surface of the compound lens. If this front surface of the compound lens is the largest diameter part of the compound lens, even though the position of the aperture stop remains within the body of the lens, the exit pupil of adjacent lenses can be made to abut. It should be noted that with this compound lens arrangement there are lens elements to both sides of the aperture stop and so lens elements to one side of the aperture stop are able to compensate for aberrations to the other side of the aperture stop within the compound lens. It then remains to ensure that the lenses behind the exit pupil all have diameters smaller than the exit pupil in order physically to allow the exit pupils of adjacent lens arrangements to abut.

Figure 2:
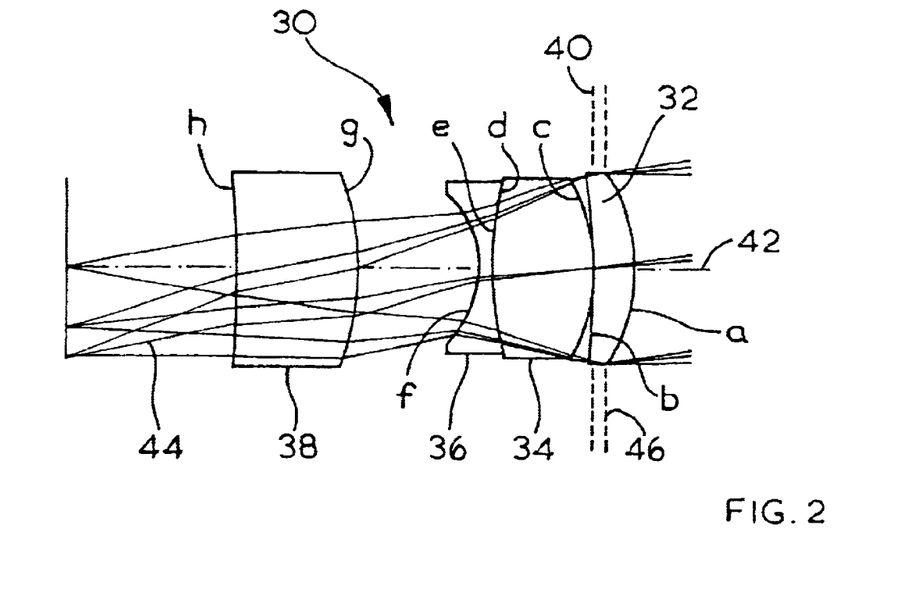
FIG. 2 shows a first embodiment of a compound lens according to the present invention.

FIG. 2 shows a first embodiment of a compound lens (30) designed in accordance with the present invention. The lens is designed using a lens design software Code V available from Optical Research Associates, 3-80 East Foothill Boulevard, Pasadena, Calif. 91107, USA which uses ray tracing algorithms.

Figure 3:
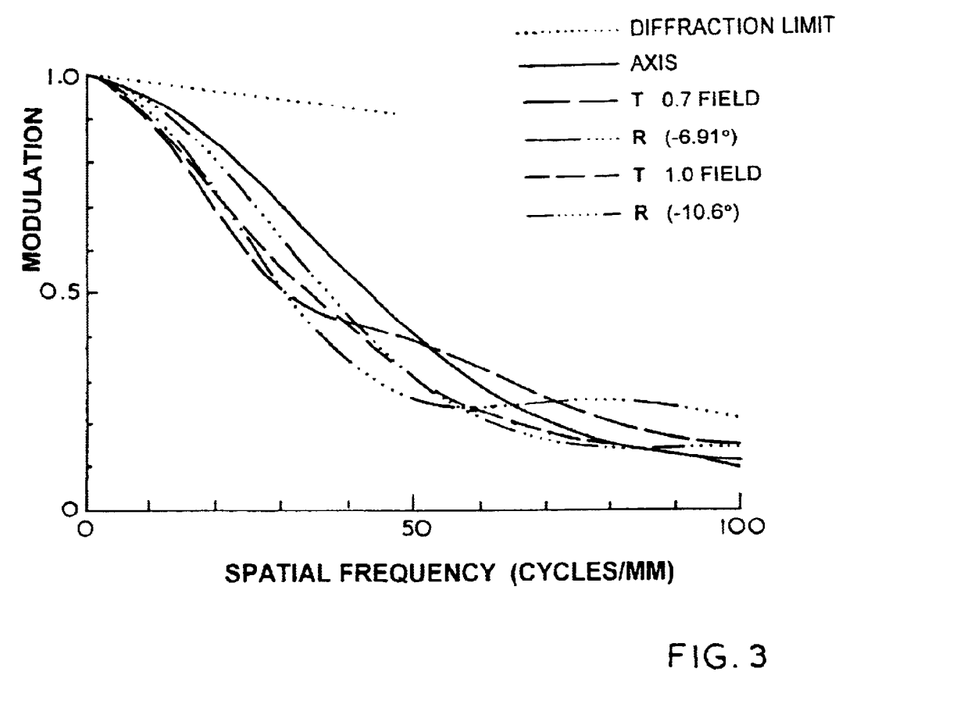
FIG. 3 shows a plot of the modulation transfer function of the compound lens of FIG. 2.

The FIG. 2 compound lens (30) comprises four lens elements (32,34,38,38) and has an effective focal length of 25 mm, an F-number of 2.5 and a field angle of 20 degrees. The aperture stop, is located in the plane (40) shown in dotted lines (ie. in the plane perpendicular to the optical axis (42) of the lens (30) at the point where the principle ray (44) crosses the axis (42)). It can be seen that the lens (30) is not symmetric about the aperture stop and so the lens (30) has a high order coma sufficient to get an aberration of 0.05 mm at a field angle of 10 degrees. Despite this the lens (30) is approximately achromatic and its modulation transfer function at 30 cycles/mm is at least 0.5 for any field point (See FIG. 3).

In FIG. 2 there are four lens elements (32,34,36,38) comprising eight lens surfaces (a to h). The lens element (32) is the front lens element and faces towards the screen (8a) or field lens (8b) in the arrangements of FIGS. 1a and 1b respectively. The front lens element (32) is made of F5 SCHOTT glass and has a front surface (a) with a radius of curvature of 10.00 mm and a rear surface (b) with a radius of curvature 36.89 mm and a thickness along its optical axis (42) of 2.00 mm. Abutting the rear surface (b) of the front lens element (32) is a second lens element (34). The second lens element (34) is made of PSK53A SCHOTT glass and has a front surface (c) with a radius of curvature 10.14 mm and a rear surface (d) with a radius of curvature −22.06 mm and a thickness along its optical axis (42) of 5.10 mm. It should be noted that the principle ray (44) crosses the optical axis (42) of the compound lens (30) at the interface between the rear surface (b) of the front lens element (32) and the front surface (c) of the second lens element (34) and so the aperture stop of the compound lens (30) lies in the plane (40) perpendicular to the optical axis (42) and which intersects the optical axis (42) at said interface. A third lens element (36) is located behind the rear surface (d) of the second lens element (34) at a distance along the optical axis (42) of the lens elements of 0.10 mm. The third lens element is made of SF4 SCHOTT glass and has a front surface (e) with a radius of curvature −18.36 mm and a rear surface (f) with a radius of curvature of 5.79 mm and a thickness along its optical axis (42) of 0.55 mm. A rear lens element (38) made of SF4 SCOTT glass is located behind the rear surface (f) of the third lens element (36) at a distance along the optical axis (42) of the lens elements of 6.05 mm. The rear lens element (38) has a front surface (g) with a radius of curvature of 14.63 mm and a rear surface (h) with a radius of curvature of 62.17 mm and a thickness along its optical axis (42) of 6.00 mm.

The exit pupil of the compound lens (30) is located in the plane (46) shown in dotted lines in FIG. 2 and is bounded by the circumference of the front surface (a) of the front lens element (32). This can be seen more clearly in FIG. 4 which shows an upper portion of the front lens element (32) with the aperture stop, which is a virtual image of the exit pupil lying In the plane (40). In the absence of the front lens element (32) the marginal rays from all three field points (45,48,50) would intersect at point (52) as shown by the ray construction in dotted lines. Point (52) defines the upper edge of the of the aperture stop of the compound lens (30) of FIG. 2. The addition of the front lens element (32) refracts the marginal rays at its rear surface (b) so that they intersect at point (54) which is the upper edge of the exit pupil of the compound lens (46). The exit pupil is the image of the aperture stop at the image side of the aperture stop, and so lies in a plane (46) perpendicular to the optical axis (42) and is bounded by intersection points (54). The front lens element (32) is designed so that the intersection points (54) lie at the circumference of the front surface (a) of the front lens element (32). The compound lens (30) is designed so that the circumference of the front surface (a) of the front lens element (32) is greater than any other circumference of a lens element used in the compound lens. In this way adjacent compound lenses (30) can be placed together in an array with their exit pupils abutting.

Figure 4:
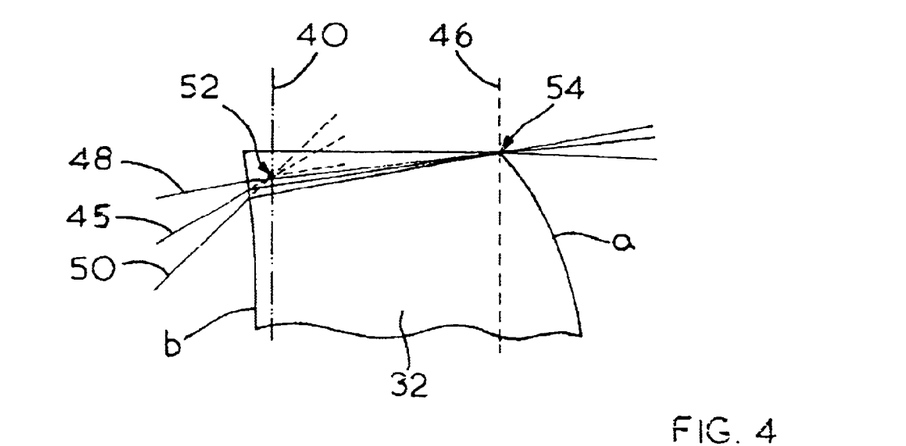
FIG. 4 shows an upper portion of the front lens element of the compound lens of FIG. 2.

The aperture stop is a virtual image of the exit pupil. The height of the aperture stop is the distance from the point (52) to the optical axis (42) and the height of the marginal ray at the exit pupil is the distance from the point (54) to the optical axis (42). It can be seen that the marginal ray heights all the way through the front lens element (32) are less than the marginal ray height at the exit pupil.

It should be noted that the front lens element (32) could be a compound lens element comprising more than one lens element.

Figure 7:
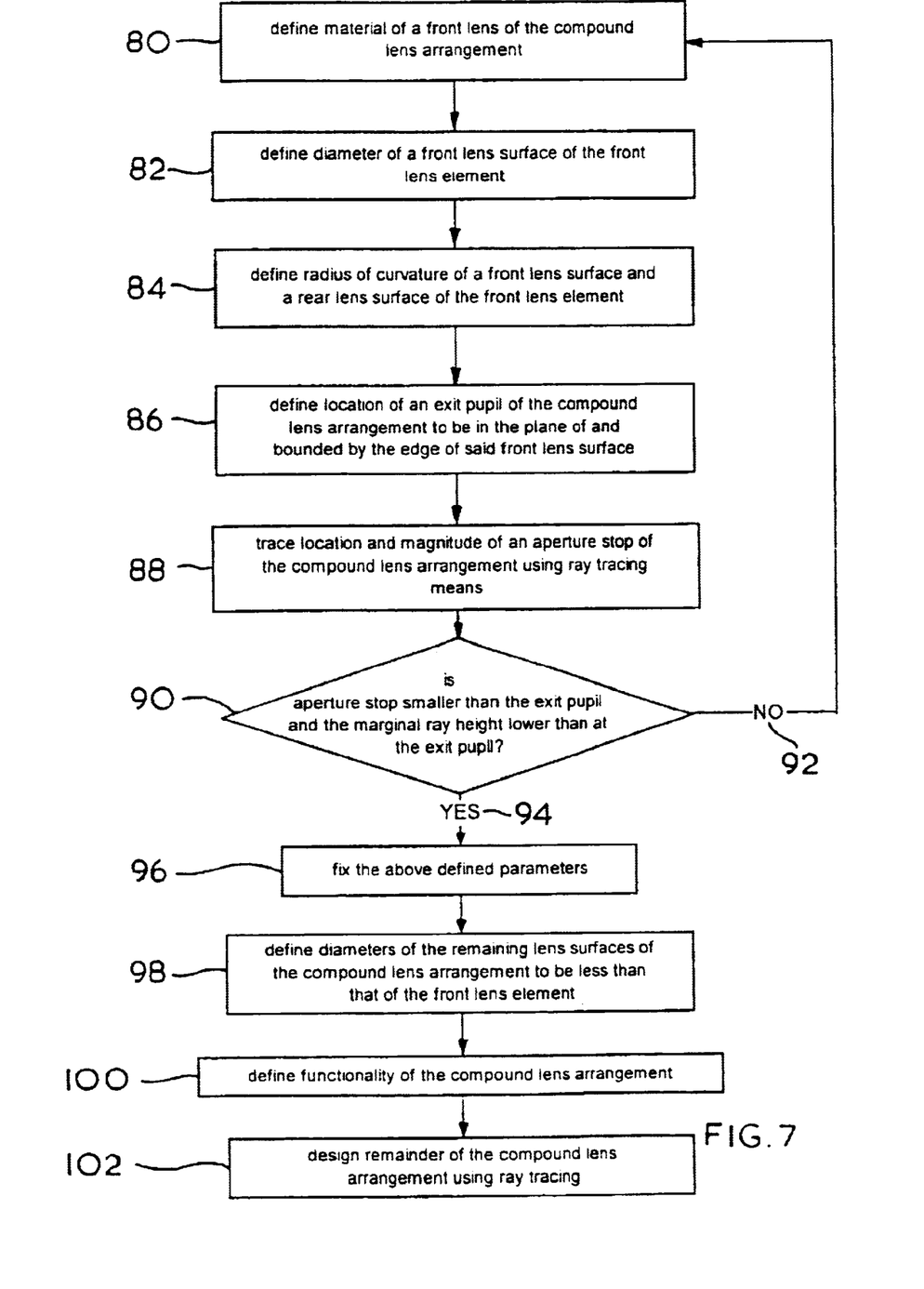
FIG. 7 shows the method steps involved in designing a compound lens arrangement according to the present invention.

The compound lens (30) is designed as indicated above using the Code V software package. It is designed in accordance with the following method, the steps of which are shown in FIG. 7:

1. Define the material of the front lens (32), which in the FIG. 2 example is F5 SCHOTT optical glass (Box 80, FIG. 7).
2. Define the diameter of the front lens element (32) (Box 82).
3. Define the radius of curvature of the front surface (a) and the rear surface (b) of the front lens element (32) (Box 84).
4. Define the location of the exit pupil to be in the plane perpendicular to the optical axis of the compound lens which intersects the edge of the front surface (a) of the front lens (32) and define the exit pupil to be bounded by the circumference of the front surface (a) of the front lens (32) (Box 86).
5. Use the ray tracing Code V software to find the diameter and location of the aperture stop (40) by tracing the marginal rays (which pass through the edge of the exit pupil) through the front lens element (32) (Box 88).
6. Repeat steps 1 to 5 (Boxes 80 to 90—via 92) until the aperture stop has a smaller diameter than the exit pupil and the marginal ray height as it is traced through the front lens element is lower than at the exit pupil. Then fix the above defined parameters (Box 96—via 94).
7. Define the diameters of the remaining lens elements of the compound lens to be less that the diameter of the front lens element (32) (Box 98).
8. Define the function of the compound lens, for example in the FIG. 2 example, the compound lens (30) is defined as a finite conjugate lens with specified object and image distances (Box 100) and design remainder of compound lens using Code V software (Box 102) without altering the relationship between the exit pupil and the marginal ray height through the front lens element.

Figure 5:
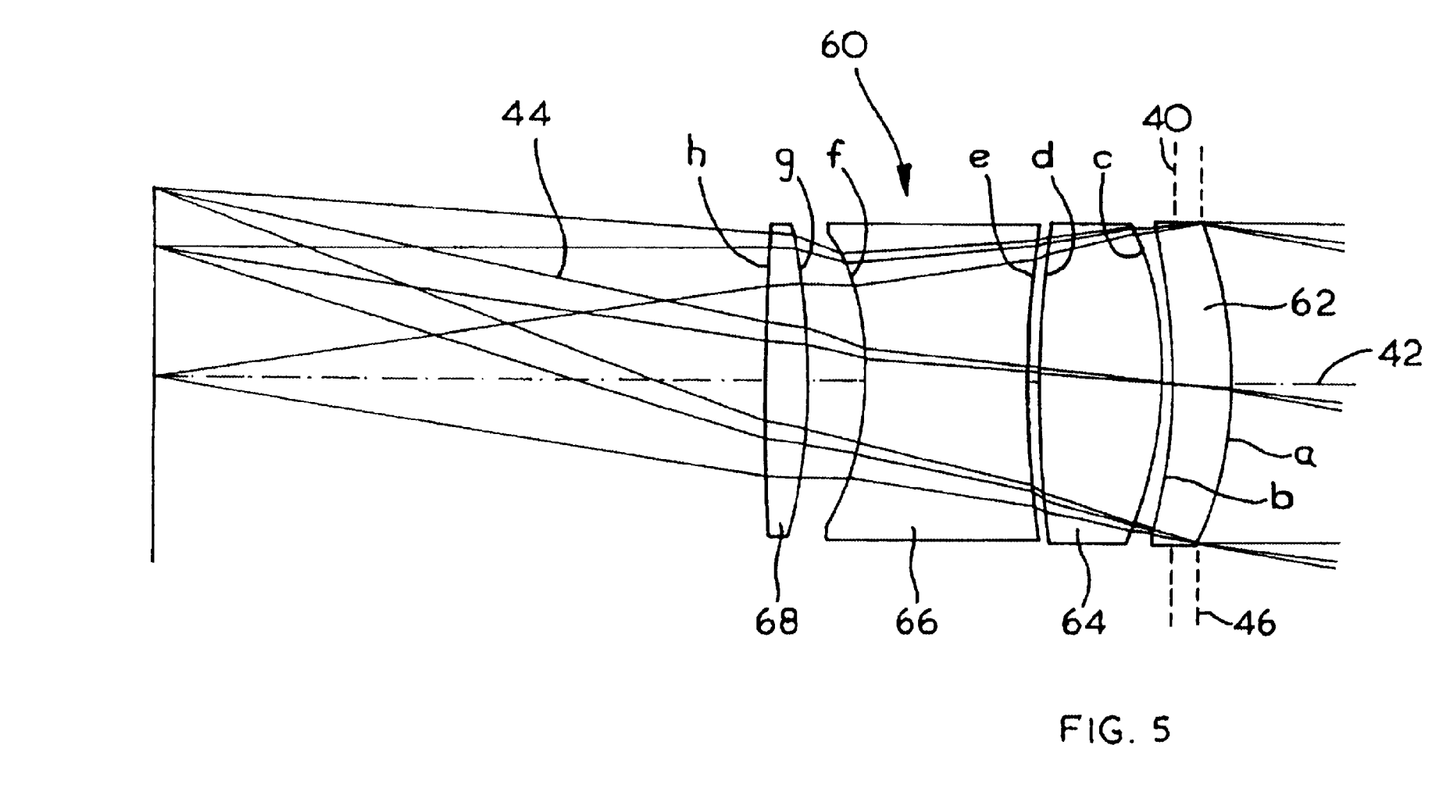
FIG. 5 shows a second embodiment of a compound lens arrangement according to the present invention.
Figure 6:
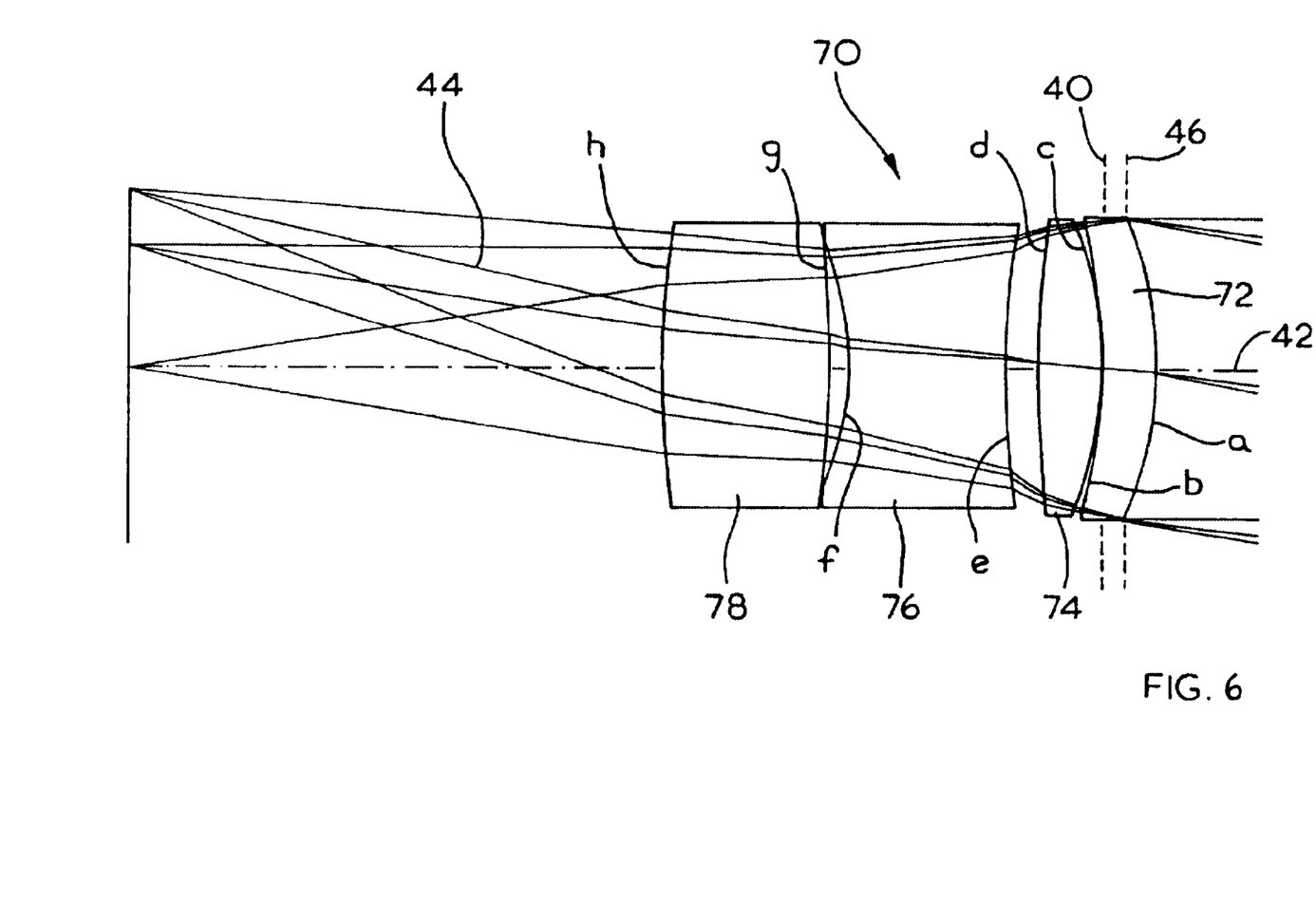
FIG. 6 shows a third embodiment of a compound lens arrangement according to the present invention.

Examples of two further compound lenses in accordance with the present invention and designed in accordance with the above method are shown in FIGS. 5 and 6.

The compound lens (60) shown in FIG. 5 comprises four lens elements (62,64,66,68) comprising eight lens surfaces (a to h). The lens element (62) is the front lens element and faces towards the screen (8*a*) or field lens (8*b*) in the arrangements of FIGS. 1*a* and 1*b* respectively. The front lens element (62) is made of SF57 SCHOTT glass and has a front surface (a) with a radius of curvature of 10.00 mm and a rear surface (b) with a radius of curvature 13.78 mm and a thickness along its optical axis (42) of 1.45 mm. It should be noted that the principle ray (44) crosses the optical axis (42) of the compound lens (60) at the rear surface (b) of the front lens element (62) and so the aperture stop of the compound lens (60) lies in the plane (40) perpendicular to the optical axis (42) and which intersects the optical axis (42) at said rear surface (b). A second lens element (64) is located behind the rear surface (b) of the front lens element (62) at a distance along the optical axis (42) of the lens elements of 0.30 mm. The second lens element (64) is made of SSK2 SCHOTT glass and has a front surface (c) with a radius of curvature 10.16 mm and a rear surface (d) with a radius of curvature −30.65 mm and a thickness along its optical axis (42) of 3.11 mm. A third lens element (66) is located behind the rear surface (d) of the second lens element (64) at a distance along the optical axis (42) of the lens elements of 0.34 mm. The third lens element (66) is made of SF59 SCHOTT glass and has a front surface (e) with a radius of curvature −24.66 mm and a rear surface (f) with a radius of curvature of 7.21 mm and a thickness along its optical axis (42) of 4.07 mm. A rear lens element (68) made of SF59 SCHOTT glass is located behind the rear surface (f) of the third lens element (66) at a distance along the optical axis (42) of the lens elements of 1.46 mm. The rear lens element (68) has a front surface (9) with a radius of curvature of 16.10 mm and a rear surface (h) with a radius of curvature of −51.68 mm and a thickness along its optical axis (42) of 1.14 mm.

The exit pupil of the compound lens (60) is located in the plane (46) shown in dotted lines in FIG. 5 and is bounded by the circumference of the front surface (a) of the front lens element (62).

The compound lens (70) shown in FIG. 6 comprises four lens elements (72,74,76,78) comprising eight lens surfaces (a to h). The lens element (72) is the front lens element and faces towards the screen (8*a*) or field lens (8*b*) in the arrangements of FIGS. 1*a* and 1*b* respectively. The front lens element (72) is made of SF57 SCHOTT glass and has a front surface (a) with a radius of curvature of 10.00 mm and a rear surface (b) with a radius of curvature 13.78 mm and a thickness along its optical axis (42) of 1.45 mm. It should be noted that the principle ray (44) crosses the optical axis (42) of the compound lens (70) at the rear surface (b) of the front lens element (72) and so the aperture stop of the compound lens (70) lies in the plane (40) perpendicular to the optical axis (42) and which intersects the optical axis (42) at said rear surface (b). A second lens element (74) abuts the rear surface (b) of the front lens element (62). The second lens element (74) is made of SSK2 SCHOTT glass and has a front surface (c) with a radius of curvature 9.56 mm and a rear surface (d) with a radius of curvature −37.45 mm and a thickness along its optical axis (42) of 1.72 mm. A third lens element (76) is located behind the rear surface (d) of the second lens element (74) at a distance along the optical axis (42) of the lens elements of 0.93 mm. The third lens element (73) is made of SF58 SCHOTT glass and has a front surface (e) with a radius of curvature −22.30 mm and a rear surface (f) with a radius of curvature of 7.44 mm and a thickness along its optical axis (42) of 4.23 mm. A rear lens element (78) made of SF58 SCHOTT glass is located behind the rear surface (f) of the third lens element (76) at a distance along the optical axis (42) of the lens elements of 0.50 mm. The rear lens element (78) has a front surface (g) with a radius of curvature of 22.46 mm and a rear surface (h) with a radius of curvature of −28.64 mm and a thickness along its optical axis (42) of 4.60 mm.

The exit pupil of the compound lens (70) is located in the plane (46) shown in dotted lines in FIG. 6 and is bounded by the circumference of the front surface (a) of the front lens element (62).

What is claimed is:

1. A compound lens (30, 60, 70) for use in an array (12, 14, 16) of such lenses comprising at least two lens elements including a front lens element (32, 62, 72) having a front lens surface (32*a*, 62*a*, 72*a*) which is the largest diameter lens surface in the compound lens, characterised in that the exit pupil of the compound lens is bounded by and lies in the plane (46) of the edge of said front lens surface.

2. A compound lens according to claim 1 wherein the compound lens has an aperture stop which lies in front of the lens elements of the compound lens other than the front lens element (32, 62, 72).

3. A compound lens according to claim 1 wherein the front lens element (32, 62, 72) has a rear lens surface (32*b*, 62*b*, 72*b*) and the compound lens has an aperture stop which lies in a plane (40) which intersects the optical axis (42) of the compound lens at the rear lens surface.

4. A compound lens according to claim 1 wherein the front lens element is a compound lens.

5. A compound lens according to claim 1 wherein the front lens element is a single lens (32, 62, 72).

6. A compound lens according to any claim 1 wherein the front lens element (32, 62, 72) is the largest diameter lens element in the compound lens.

7. A compound lens according to claim 1 wherein a rear lens surface (32*b*, 62*b*, 72*b*) of the front lens element (32, 62, 72) is concave.

8. A compound lens according to any claim 1 wherein the front lens surface (32*a*, 62*a*, 72*a*) of the front lens element (32, 62, 72) is convex.

9. A projector (2, 4, 6) for use in an array of such projectors comprising a compound lens (12, 14, 16) according to claim 1.

10. An autostereo projection system comprising an array of projectors (2, 4, 6) according to claim 9.

11. A method of designing a compound lens (30, 60, 70) for use in an array of such lenses comprising the steps of;

defining the material of a front lens element (32, 62, 72) of the compound lens, the diameter of a front lens surface (32*a*, 62*a*, 72*a*) of the front lens element, the radius of curvature of the front lens surface and a rear lens surface (32*b*, 62*b*, 72*b*) of the front lens element and defining the location of an exit pupil of the compound lens to be bounded by and in the plane (46) of the edge of said front lens surface, based on the above defined parameters, tracing the location and magnitude of an aperture stop of the compound lens by tracing the marginal ray height through the front lens element using ray tracing means, repeating the above steps until the marginal ray height traced through the front lens element is highest at the exit pupil and then fixing the above defined parameters, defining the diameters of the remaining lens surfaces (c, d, e, f, g, h) of the compound lens to be less that of the front lens surface (32a, 62a, 72a) of the front lens element and defining the functionality of the compound lens, and using ray tracing means to design the remainder of the compound lens in such a way that the remaining lens surfaces do not alter the relationship between the exit pupil and the marginal ray height through the front lens element as defined above.

12. A method according to claim 11 wherein the parameters defined in the first step of the method are only fixed when the diameter of the aperture stop is less than the diameter of the exit pupil.

13. A method according to claim 11 wherein the step of defining the diameter of the front lens surface (32a, 62a, 72a) of the front lens element (32, 62, 72) comprises the step of defining the diameter of the front lens element.

14. A method according to claim 11 wherein the step of defining the functionality of the compound lens comprises the step of defining the compound lens as a finite conjugate lens with specified object and image distances.

* * * * *